Nov. 10, 1925.
W. G. MILLIGAN
1,561,008
HOOD CLAMP AND THE LIKE
Filed Nov. 7, 1924
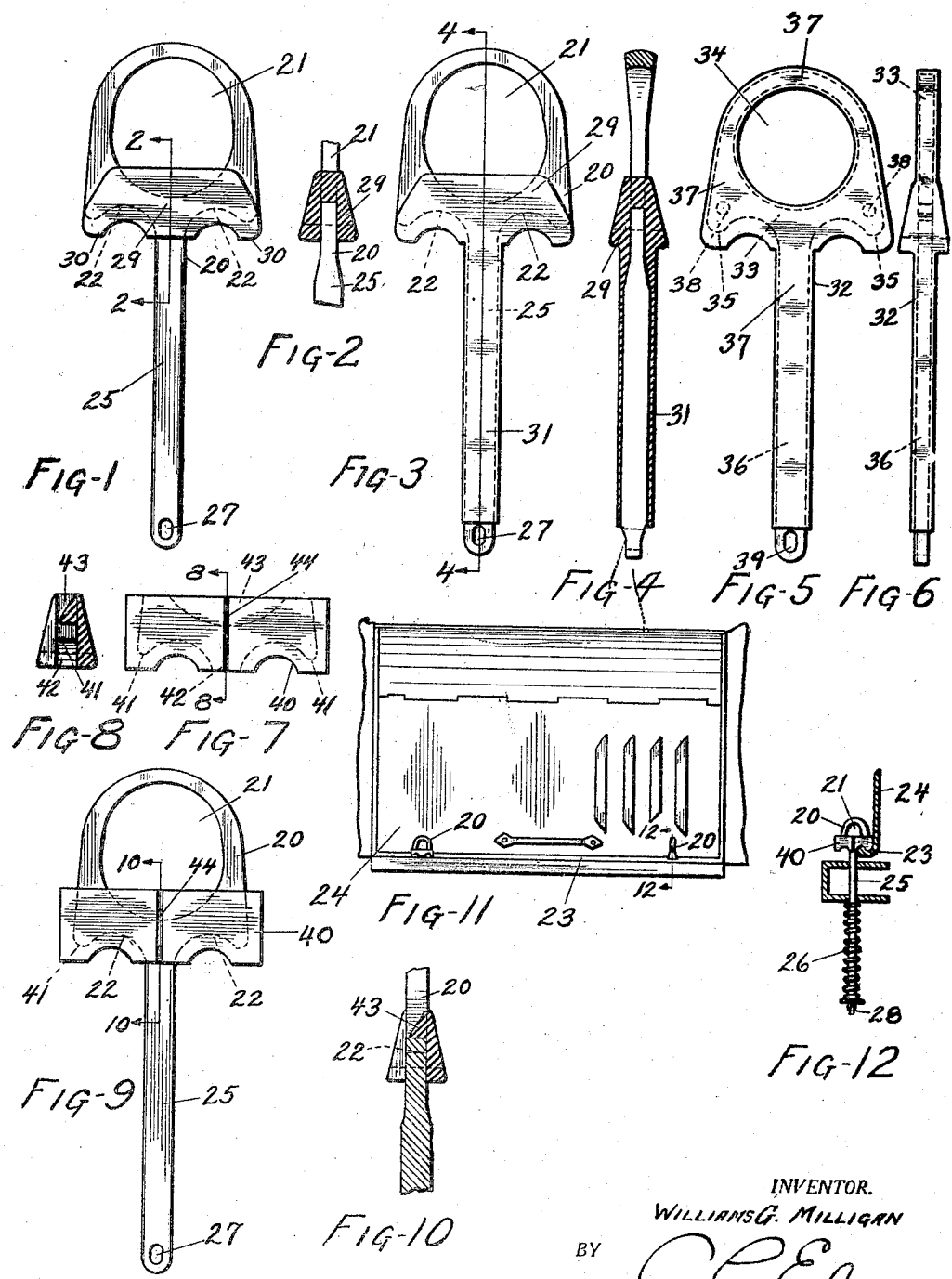
INVENTOR.
WILLIAMS G. MILLIGAN
BY 
ATTORNEY Patented Nov. 10, 1925.

1,561,008

UNITED STATES PATENT OFFICE.

WILLIAMS G. MILLIGAN, OF AKRON, OHIO.

HOOD CLAMP AND THE LIKE.

Application filed November 7, 1924. Serial No. 748,361.

*To all whom it may concern:*

Be it known that I, WILLIAMS G. MILLIGAN, a citizen of the United States, and a resident of Akron, county of Summit, State of Ohio, have invented certain new and useful Improvements in Hood Clamps and the like, of which the following is a specification.

This invention relates to hood clamps for automobiles or the like.

The purpose of the invention, in general, is to provide a clamp, the clamping surface of which, that is, the surface engaged with the hood, is non-metallic so that vibrations will be absorbed thereby and noise, such as rattling or squeaking resulting from movement of metal on metal will be obviated.

The objects of the invention are obtained in any of a number of forms thereof described below and illustrated in the accompanying drawings. It is to be understood, however, that the description and drawings describe in detail only several of a large number of modifications of the invention, so that the same is not limited to the specific forms disclosed herein.

Of the accompanying drawings:

Figure 1 is a side elevation of one form of hood clamp constructed in accordance with the invention;

Figure 2 is a part section of line 2—2 of Figure 1;

Figure 3 is a side elevation of another form of clamp embodying the invention;

Figure 4 is a part section on line 4—4 of Figure 3;

Figure 5 is a side elevation of another clamp embodying the invention;

Figure 6 is an edge elevation thereof;

Figure 7 is a side elevation of an article adapted to be attached to a present form of clamp so that it may derive the benefits of the invention;

Figure 8 is a section on line 8—8 of Figure 7;

Figure 9 is a side elevation of a clamp having the article of Figures 7 and 8 mounted thereon;

Figure 10 is a section on line 10—10 of Figure 9;

Figure 11 is a view of an automobile illustrating the positions of the clamps in use, one of the clamps of the invention being shown in clamping position and the other in non-clamping position; and Figure 12 is an enlarged detail section on line 12—12 of Figure 10.

Referring to the drawings, 20 designates a metallic clamp of ordinary construction formed with an eye 21 for receiving the fingers, hook-like portions 22—22 which heretofore have engaged the metal beads 23 on the lower edges of the hood 24 (Figures 11 and 12), and formed with a shank 25 about which a compression spring 26 is adapted to be placed, the shank 25 having an aperture 27 therein for receiving a spring securing pin or the like 28.

In Figures 1 and 2 there is shown vulcanized onto the clamp 20 over the hook portions 22 and through the eye 21, a mass of rubber 29. The rubber 29 is so molded about the hook portions 22 as to follow the general outline thereof, to provide, in effect, rubber hooks 30, 30 which are arranged to engage the beads 23 on the lower edges of the automobile hood 24, to absorb vibrations and obviate noises due to rubbing of metal on metal. Almost any non-metallic material capable of being shaped or molded or to be secured so as to fit about the clamp 20 may be employed instead of the preferred material rubber in order to secure the desired results. For example, materials in some respects equivalent to rubber for this use are pulp, leather, wood, bakelite, etc. Rubber, however, is the preferred material because of its great ability to absorb vibration and prevent noise together with its well-known resistance to weather conditions, its waterproof, qualities, etc.

Referring to Figures 3 and 4, the shank 25 of the clamp instead of being left bare as illustrated in Figure 1, may also be covered with rubber or other non-metallic material as indicated at 31, so that it also will be incapable of rattling against the metal, for example, through which it extends, as shown in Figure 11, or to prevent rattling of spring 26 against shank 25.

With respect to the clamp shown in Figures 5 and 6, it is to be noted that the invention contemplates in effect making a clamp 32 of rubber or other non-metallic material having a reinforcement 33 embedded therein. The reinforcement 33 may be a sheet metal stamping formed with an eye 34, hook portions 35, 35 and shank 36 about which the rubber 37 is vulcanized or other suitable material is molded. Apertures 38, 38 may be formed in the stamping 33 so that the rubber or other material forced therethrough during the vulcanizing or molding process will, in effect, form rivets for securing the rubber or other material onto the clamp. The lower end of shank 36 may project out of the rubber or other material and be apertured as at 39 to provide an aperture similar to 27 and for the same purpose.

For use on present equipment, there is shown in Figures 7 and 8, a molded pad 40 of non-metallic material, such as vulcanized rubber, so shaped as to fit on the present metallic clamp and to be mountable thereon without removing the clamp from the automobile. The pad 40 is formed with a socket 41 in its upper surface shaped to the outline of the lower portion of the eye and the clamp portions of the clamp 20. An aperture 42 is provided therein to receive the shank 25 of the clamp 20. A lug 43 of the material of the pad is arranged on one wall of socket 42 (Figure 8) so as to extend through eye 21 nearly into engagement with the other wall thereof. The latter wall is provided with a vertical slit 44 to permit slipping of the pad over shank 25 after the clamp is already mounted in the machine for use. The pad 40 is shown applied to a clamp 20 in Figures 9 to 12 inclusive.

As will be apparent from the foregoing, in all forms there will be no metal contact of the clamp with the hood. Tension will be maintained on the shank 25 or 36 to yieldingly urge the rubber or other non-metallic hood-engaging clamp surface against the bead of the hood. In the forms shown in Figures 3 to 6 inclusive there can be no metal contact with the clamp anywhere except at apertures 27 and 39 where the spring is secured. Accordingly noises, such as rattling and squeaking of the hood and clamps are entirely avoided.

Modifications of the invention may be resorted to without departing from the spirit thereof or the scope of the appended claims.

What is claimed is:

1. The combination with an automobile hood having a bead on its lower edge, of a clamp for securing said hood in place by engagement with said beaded edge said clamp comprising a metallic member formed with an eye and a hook-like, bead-engaging portion, said portion being covered with a layer of noise-deadening material, the material being so formed as to engage through said eye whereby it is held in place on said metallic member.

2. The combination with an automobile hood having a bead on its lower edge, of a clamp for securing said hood in place by engagement with said beaded edge, said clamp comprising a metallic stamping formed with hook-like bead engaging portions and coated with a layer of noise-deadening material.

3. The combination with an automobile hood having a bead on its lower edge, of a clamp for securing said hood in place, said clamp including a metallic stamping shaped to provide a handle, a bead-engaging hook and a shank adapted to be connected to a clamp operating spring, said handle, hook and shank being embedded in and permanently vulcanized to an outer layer of rubber.

WILLIAMS G. MILLIGAN.